United States Patent

Suckow

[15] 3,700,262
[45] Oct. 24, 1972

[54] SPRING BAR TRAILER HITCH ASSEMBLY

[72] Inventor: Theodore K. Suckow, 160 Rock Rd., Glen Rock, N.J.

[22] Filed: July 12, 1971

[21] Appl. No.: 161,693

[52] U.S. Cl. ............................................280/406 A
[51] Int. Cl. ..............................................B60d 1/06
[58] Field of Search..........................280/406 A, 406

[56] References Cited

UNITED STATES PATENTS 3,185,499  5/1965  Reese ....................280/406 A
3,542,394  11/1970  Palage ...................280/406 A

*Primary Examiner*—Leo Friaglia
*Attorney*—Arthur Frederick

[57] ABSTRACT

In a spring bar trailer hitch assembly having spring bars each of which are connected at one end to the tractive vehicle to extend on one side of the trailer and the opposite distal end connected to the trailer so as to be free to move longitudinally relative to the trailer, the improvement comprising the connection of each of the spring bars in planes horizontally offset from the plane in which the hitch ball is located so that upon pivotal movement of the tractive vehicle and trailer relative to each other, as in fishtailing, will meet with significant initial resistance by both spring bars, but as the trailer moves further from the centerline of the tow car as in rounding a curve, the longitudinal movement of one of the spring bars relative to the trailer will be greater than such movement of the other spring bar thereby effecting a greater force on the side of the trailer on the outside of the curve than the force exerted on the side of the trailer located on the inside of the turn.

8 Claims, 3 Drawing Figures

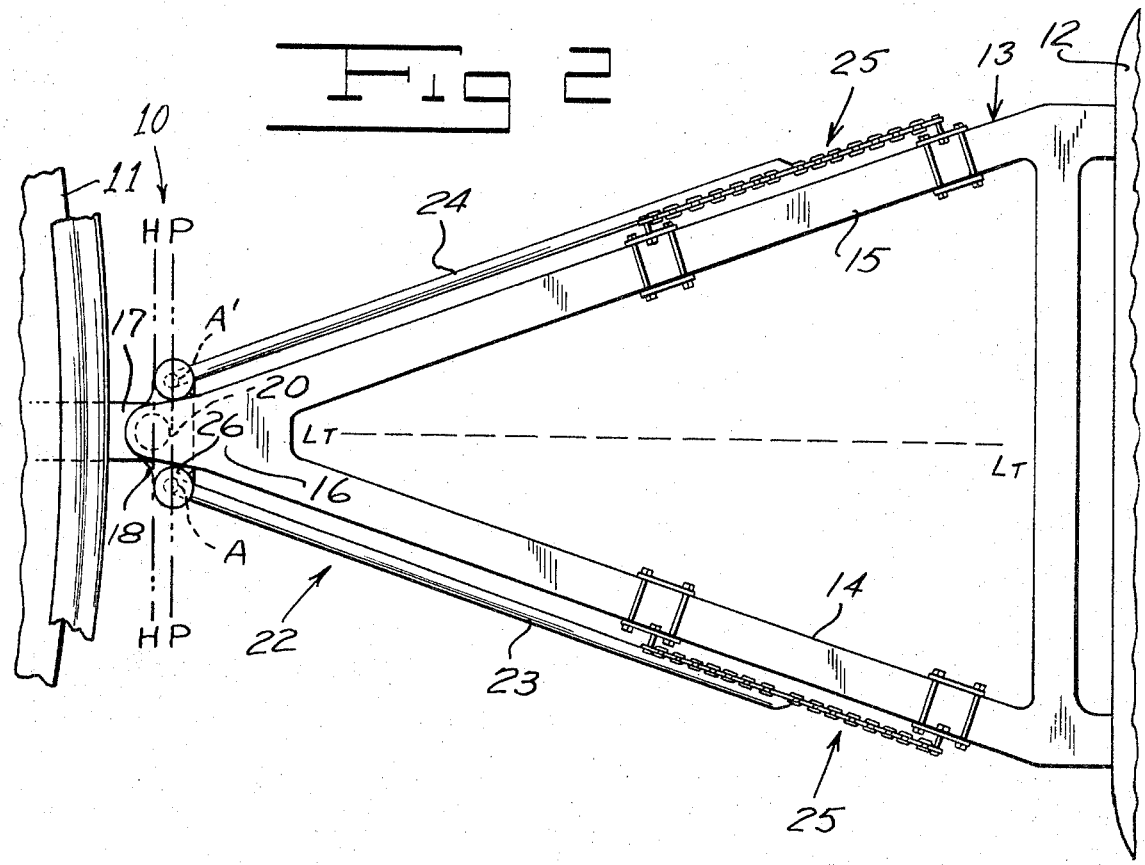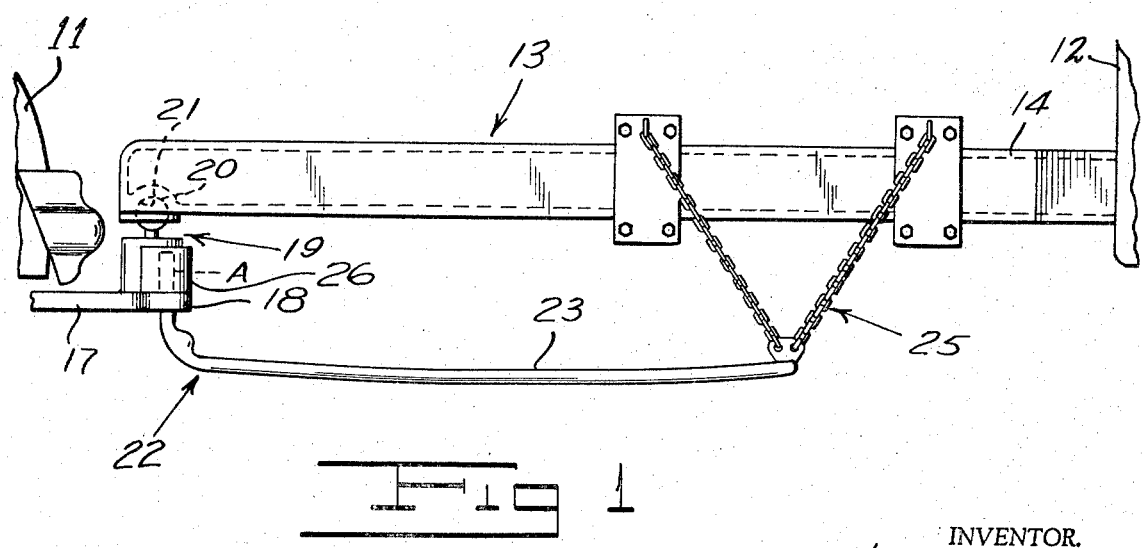

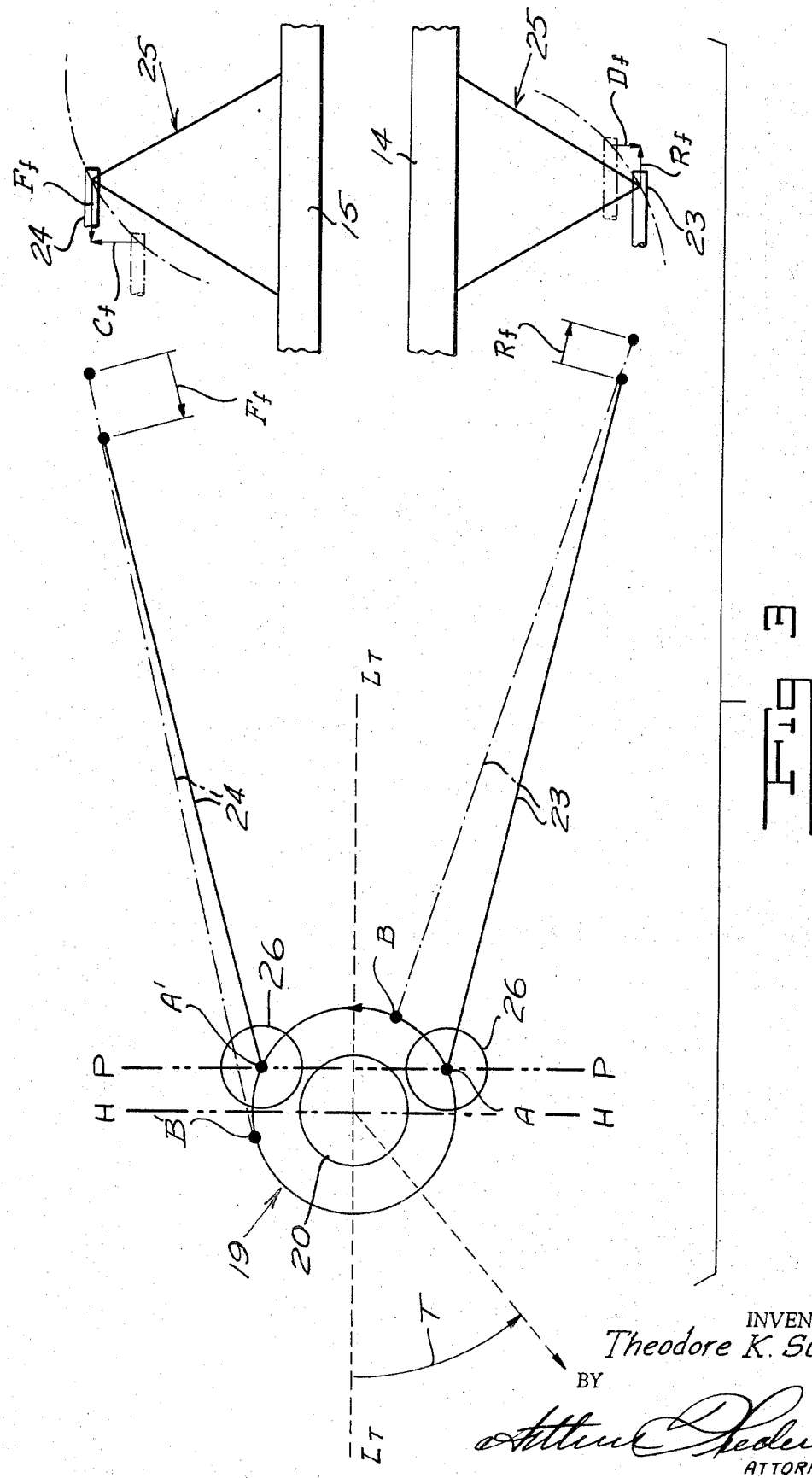

SPRING BAR TRAILER HITCH ASSEMBLY

This invention relates to load-transferring trailer hitches of the type having spring bars each of which is pivotally secured at one end to the tractive motor vehicle and at the opposite end connected to the A-frame of the trailer (hereinafter referred to as "spring bar trailer hitch assembly"). Still more particularly the invention relates to an improved spring bar trailer hitch assembly of the type disclosed in the applicant's co-pending U.S. patent application, Ser. No. 133,239, filed April 12, 1971 and as shown in U.S. Pat. No. 2,597,657 to Mathisen.

BACKGROUND OF THE INVENTION

In spring bar trailer hitch assemblies, as exemplified in applicant's aforesaid co-pending application and in the U.S. patents to Mathisen, No. 2,597,657; Bock et al., No. 3,206,224; Mosley, No. 2,643,891; Reese, No. 3,185,499 and Hendricks, No. 3,552,771, the spring bars of the assemblies function to distribute the trailer weight more evenly between the front and rear wheels of the tractive vehicle and, under driving conditions, operate to resist side sway. It has been also found that improved stability of the tractor-trailer combination can be achieved, particularly on high speed turns, if, as disclosed in the U. S. patent to Reese, No. 3,194,584, the flexure of the spring bar on the outside of the turn is more than the flexure of the spring bar on the inside of the turn. This tends, through the different reactive forces exerted by the spring bars, to elevate the trailer A-frame slightly and simultaneously tilt the A-frame in the direction of the turn. In the aforesaid Reese Patent, No. 3,194,584, this greater reactive force exerted by the spring bar on the outside of the curve than exerted by the spring bar located on the inside of the curve is accomplished by providing a relatively expensive and complex structure wherein the distal end of the spring bar carries two camming surfaces of different heights which alternately ride on a knuckle, depending upon whether the spring bar is located on the inside or outside of the turn.

Accordingly, it is an object of the present invention to provide an improved spring bar trailer hitch assembly which is capable of exerting a significantly greater spring bar force on one side of the trailer than on the other side of the trailer when the tractor-trailer combination significantly deviates from the straight line of travel.

It is another object of this invention to provide an improved spring bar trailer hitch assembly capable of providing a high degree of stability to the tractor-trailer combination on turns, particularly while traversing such turns at relatively high speeds.

A further object of the present invention is to provide an improved spring bar trailer hitch assembly capable of imparting to the tractor-trailer combination a high degree of stability on turns and which assembly is relatively inexpensive to fabricate and easy to assemble.

SUMMARY OF THE INVENTION

Accordingly, this invention contemplates an improved spring bar trailer hitch assembly for a tractor-trailer combination pivotally connected together wherein each of the spring bars is connected, at one end, to the tractive vehicle and, at the opposite end, suitably connected, such as by a tether, to the trailer, and wherein the ends of the spring bars connected to the tractive vehicle are connected in planes horizontally offset from the plane in which the pivotal connection between the tractor-trailer combination is located. This horizontal offset relationship between the spring bar connections and the pivotal connection of the tractor-trailer combination automatically effects different longitudinal movements of the spring bars relative to the frame so that the vertically downwardly directed force exerted by the spring bars will be of greater magnitude on one side of the trailer than on the other side. It is preferred for the stability of the tractor-trailer combination in traversing turns to locate the ends of the spring bar connections with the tractive vehicle in a plane horizontally and rearwardly offset from the pivotal connection between the tractor-trailer combination so that a greater reactive, vertically downwardly directed force is exerted by the spring bar located on the outside of the turn than the reactive force exerted by the spring bar on the inside of the turn.

BRIEF DESCRIPTION OF THE DRAWINGS

The above and other objectives and advantages of this invention will appear more fully hereinafter from a consideration of the detailed description which follows when taken together with the accompanying drawings wherein one embodiment of the invention is illustrated, and in which:

FIG. 1 is a fragmentary plan view of a tractor-trailer combination having a spring bar trailer hitch assembly according to the present invention;

FIG. 2 is a fragmentary view in side elevation of the spring bar trailer hitch assembly shown in FIG. 1; and FIG. 3 is a schematic view showing how the spring bar trailer hitch assembly according to this invention functions to provide different reactive forces on opposite sides of the trailer when the tractor-trailer combination deviate from in-line travel.

DESCRIPTION OF THE PREFERRED EMBODIMENT

Now referring to the drawings, the reference number 10 generally designates a tractor-trailer combination comprising a tractive vehicle 11 and a trailer 12 which has a trailer tongue or A-frame 13. The A-frame 13 has two side channel members 14 and 15 which meet at an apex portion 16. Attached to the chassis (not shown) of tractive vehicle 11 is a carrier 17 at the distal end of which is secured by welding or other suitable means a bracket 18. A ball hitch 19 is secured to bracket 18, the ball 20 of the ball hitch being receivable in a socket 21 in the apex portion 16 of the trailer A-frame 13. To improve stability of the tractor-trailer combination and minimize "jackknifing" and side sway, a spring bar assembly 22 of the cantilever type is connected to tractor-trailer combination 10.

The spring bar assembly 22 comprises two spring bars 23 and 24 which are pivotally connected at their ends A and A', respectively, to bracket 18 and positioned to extend below and substantially parallel to channel members 14 and 15. The opposite distal end of each of the spring bars 23 and 24 is connected to the adjacent channel member by a suspension means 25 which places the spring bars under a predetermined tension and also permits the spring bars to move longitudinally relative to channel members 14 and 15 when the tractive vehicle 11 and trailer 12 move out of the line-of-travel LT by pivotal movement at ball hitch 19. The suspension means 25 may be of dual member type which is fully described in applicant's co-pending U.S. application, Ser. No. 133,239, filed Apr. 12, 1971 or of the single member type disclosed in U. S. Pat. No. 2,597,657 to Mathisen. The spring bar assembly 22 functions, as is well known, to exert an increased vertically downwardly directed force on channel members 14 and 15 when the tractive vehicle and the trailer pivot out of the line-of-travel LT to cause the spring bars 23 and 24 to move longitudinally relative to channel members 14 and 15.

In accordance with the present invention, spring bar assembly 22 includes the location of pivot connections 26 for the ends A and A' of spring bars 23 and 24 in a vertical plane P—P horizontally offset from the plane H—H in which ball hitch 20 is located. As best illustrated in FIG. 3, it is preferred to locate pivot connections 26 in plane P—P spaced rearwardly of the plane H—H. This feature functions to cause spring bar 23 and 24 to move longitudinally different amounts so that different vertically downwardly directed forces are exerted on A-frame 13 when tractor-trailer combination moves out of the line-of-travel LT.

As illustrated in FIG. 3, when the tractor-trailer combination moves out of alignment along the line-of-travel LT so that the tractive vehicle and trailer pivot relative to each other about ball hitch 19 in the counter-clockwise direction shown by the arrow T, pivot connections 26 of spring bars 23 and 24 move from their normal positions A and A' to positions B and B'. This arcuate movement of the pivot connections results in a longitudinal movement of spring bar 23 a distance $R_f$ and spring bar 24 a longer distance $F_f$. These longitudinal movements result in elevating the distal end of the respective spring bars 23 and 24 a distance of $D_f$ and $C_f$. Since the vertical displacement, $C_f$, of the end of spring bar 24 is greater than the vertical displacement, $D_f$, the vertically, downwardly directed force exerted by spring bar 24 on A-frame 13 is of greater magnitude than the force exerted by spring bar 23. Thus, it can be readily understood that a greater force is exerted on the A-frame on the side located on the outside of the turn or curve than is exerted on the side of the A-frame on the inside of the turn or curve. This unequal force exerted by spring bars 23 and 24 tends simultaneously to elevate trailer A-frame slightly and also to tilt the trailer A-frame laterally in the direction of the turn. This also has the effect of preventing at least some of the additional weight which tends to shift to the front outside wheel of the tractive vehicle while rounding a curve from so shifting such that the front inside wheel carries some of the additional load and, thereby, contribute to the stability of the tractor-trailer combination while traversing a curve. This action simulates a banked curve and thereby greatly increases the stability of the tractor-trailer combination while traversing a curve.

While the present invention has application to a wide range of spring bars, such as those having suspension means of the single member type or multiple member types of two or more tethering members, it is preferable to employ the present invention in combination with the dual suspension type spring bars as is fully disclosed in the co-pending U. S. patent application, Ser. No. 133,239, filed Apr. 12, 1971. The dual suspension device is preferred because it provides per increment of longitudinal movement of the spring bars a significantly greater flexure of each of the spring bars and, hence, a greater stabilizing force than provided by the single suspension type.

It is believed now readily apparent that the present invention provides an improved spring bar trailer hitch assembly which is relatively simple and inexpensive yet is capable of providing increased stability of the tractor-trailer combination on turns particularly at relatively high speeds.

Although but one embodiment is shown and described by way of example, the invention is not to be limited except as limited by the claims. Various other changes and alternative arrangements and constructions can be made without departing from the spirit and scope of the invention as the same will now be understood by those skilled in the art.

What is claimed is:

1. A spring bar trailer hitch assembly for a tractor-trailer combination pivotally connected together comprising, in combination:
   a. a spring bar means on each side of the trailer connected to the tractive vehicle and the trailer so as to be free to move longitudinally relative to the trailer when the trailer and tractive vehicle move out of alignment and exert a vertically downwardly directed force on the trailer; and
   b. connecting means for connecting each of said spring bars to the tractive vehicle located in plane horizontally rearwardly offset from the plane in which the pivotal connection between the tractive vehicle and the trailer is located, said connecting means for each spring bar being a pivotal connection and the opposite distal portion being connected to the trailer by supporting means pivotally connected at opposite ends to the trailer and associated spring bar so that, upon pivotal movement of the tractive vehicle and trailer relative to each other, the longitudinal movement of one of the spring bars relative to the trailer will be greater than such movement of the other spring bar thereby effecting a greater downwardly directed force on one side of the trailer than exerted by the other spring bar on the opposite side of the trailer.

2. The combination of claim 1 wherein said supporting means is a flexible suspension member.

3. The combination of claim 1 wherein said supporting means is a chain.

4. The combination of claim 1 wherein said supporting means is a cable.

5. The combination of claim 1 wherein said supporting means comprises dual connecting members each of which is connected to the distal end portion of the associated spring bar and to the trailer at points horizontally offset from a vertical plane containing said distal end portion of the spring bar.

6. A spring bar trailer hitch assembly for a tractor-trailer combination pivotally connected together at the apex portion of the A-frame of the trailer comprising, in combination:

a. a spring bar means extending below and adjacent each side of the trailer "A" frame, pivotal connected means for connecting each of said spring bar to the tractive vehicle disposed in a plane horizontally offset in a rearward direction away from the plane in which the pivotal connection of the tractor-trailer combination is located; and b. suspension means for connecting each spring bar means to the A-frame at a point remote from said pivotal connected means so as to permit free longitudinal movement of the associated spring bar relative to the A-frame when the trailer and tractive vehicle move out of alignment and exert a vertical downwardly directed force on the A-frame and so that, upon such pivotal misalignment of the tractor-trailer combination, the longitudinal movement of one of the spring bars relative to the trailer A-frame will be greater than such movement of the other spring bar thereby effecting a greater downwardly directed force on one side of the A-frame than exerted by the other spring bar on the opposite side of the A-frame.

7. The combination of claim 6 wherein said pivotal connection between the tractor-trailer combination is a ball hitch assembly.

8. The combination of claim 6 in which said suspension means for each spring bar is a dual chain connected at a substantially common nadir point on the associated spring bar and at the A-frame on opposite sides of a vertical plane containing the said common nadir point.

* * * * *